United States Patent
Larimer et al.

(10) Patent No.: US 10,949,518 B1
(45) Date of Patent: *Mar. 16, 2021

(54) SYSTEMS AND METHODS FOR CREATING A VERIFIED DIGITAL ASSOCIATION

(71) Applicant: block.one, Grand Cayman (KY)

(72) Inventors: Daniel J. Larimer, Christianburg, VA (US); Richard B. Whitner, Blacksburg, VA (US); Thomas C. Hallgren, Blacksburg, VA (US); Todd B. Fleming, Blacksburg, VA (US)

(73) Assignee: block.one, Grand Cayman (KY)

(*) Notice: Subject to any disclaimer, the term of this patent is extended or adjusted under 35 U.S.C. 154(b) by 11 days.

This patent is subject to a terminal disclaimer.

(21) Appl. No.: 16/562,317

(22) Filed: Sep. 5, 2019

Related U.S. Application Data

(63) Continuation of application No. 16/216,956, filed on Dec. 11, 2018, now Pat. No. 10,452,828.

(51) Int. Cl.
| | |
|---|---|
| *H04L 29/06* | (2006.01) |
| *G06F 21/32* | (2013.01) |
| *H04L 9/32* | (2006.01) |
| *G06F 16/182* | (2019.01) |
| *G06F 21/45* | (2013.01) |

(52) U.S. Cl.
CPC .......... *G06F 21/32* (2013.01); *G06F 16/182* (2019.01); *G06F 21/45* (2013.01); *H04L 9/3231* (2013.01); *H04L 9/3247* (2013.01); *H04L 63/083* (2013.01); *H04L 63/12* (2013.01); *G06F 2221/2101* (2013.01)

(58) Field of Classification Search
CPC ....... G06F 21/32; G06F 21/45; H04L 9/3231; H04L 9/3247; H04L 63/083; H04L 63/12

USPC .......................................................... 726/7
See application file for complete search history.

(56) References Cited

U.S. PATENT DOCUMENTS

| | | | |
|---|---|---|---|
| 10,022,613 B2 * | 7/2018 | Tran | H04W 84/18 |
| 2016/0162897 A1 * | 6/2016 | Feeney | G06Q 20/065 |
| | | | 705/71 |
| 2017/0005804 A1 * | 1/2017 | Zinder | H04L 63/123 |
| 2017/0222814 A1 | 8/2017 | Oberhauser et al. | |
| 2018/0026970 A1 | 1/2018 | Votaw et al. | |
| 2018/0255038 A1 | 9/2018 | Smith et al. | |

OTHER PUBLICATIONS

Gao, et al., "Blockchain-based Identity Management with Mobile Device", CryBlock'18. Jun. 15, 2018 [Retrieved on Jan. 29, 2020]. Entire document. Retrieved from internet: <URL:https://dl.acm.org/doi/10.1145/3211933.3211945> Entire document.

Notification of Transmittal of the International Search Report and the Written Opinion of the International Searching Authority, or the Declaration, dated Feb. 19, 2020, 7 pages.

* cited by examiner

*Primary Examiner* — Longbit Chai
(74) *Attorney, Agent, or Firm* — McDermott Will & Emery

(57) ABSTRACT

Methods and systems for creating a digital association are provided. The method includes obtaining a first user-generated item comprising identifiable features of a first user and a second user. The method also includes obtaining a second user-generated item comprising the identifiable features of the first user and the second user. The method also includes cross-confirming that the first and second user-generated items are valid to verify the digital association.

20 Claims, 6 Drawing Sheets

SYSTEMS AND METHODS FOR CREATING A VERIFIED DIGITAL ASSOCIATION

CROSS-REFERENCE TO RELATED APPLICATION

This present application claims the benefit of priority under 35 U.S.C. § 120 as a continuation of U.S. patent application Ser. No. 16/216,956, filed Dec. 11, 2018, now allowed, the disclosure of which is hereby incorporated by reference in its entirety for all purposes.

TECHNICAL FIELD

The present disclosure generally relates to identity verification, and more specifically relates to creation of a verified digital association.

BACKGROUND

The ability for a system of governance to uniquely identify individuals is fundamental to a functioning society. As a result, it is desirable to uniquely identify individuals with a low probability that the individuals are fake and also with a low probability of deception. It is also desirable to allow identified individuals the ability to make provable statements with a low probability of forgery.

Current techniques for verifying an individual's identity are based on tying the individual's identity to a government issued document, such as a driver's license, passport, birth certificate, social security card, etc. These forms of identity verification require government support, and with some effort can be falsified. Private identity systems that currently exist are also based on government created documents, and so are also susceptible to the same flaws of having counterfeits. Fake identities are problematic because they allow individuals to subvert traditional channels of responsibility. Identity theft is also problematic because it causes innocent people to be harmed by the actions of bad actors. As a result, there is a need for improved identity verification to overcome these issues.

SUMMARY

The present disclosure provides for systems and methods for creating a secure and verifiable digital association.

According to one embodiment of the present disclosure, a computer-implemented method for creating a digital association is provided. The method includes obtaining a first user-generated item comprising identifiable features of a first user and a second user. The method also includes obtaining a second user-generated item comprising the identifiable features of the first user and the second user. The method also includes cross-confirming that the first and second user-generated items are valid to verify the digital association.

According to one embodiment of the present disclosure, a system is provided that includes means for storing instructions, and means for executing the stored instructions that, when executed by the means, cause the means to perform a method for creating a digital association. The method includes obtaining a first user-generated item comprising identifiable features of a first user and a second user. The method also includes obtaining a second user-generated item comprising the identifiable features of the first user and the second user. The method also includes cross-confirming that the first and second user-generated items are valid to verify the digital association.

According to one embodiment of the present disclosure, a system is provided for creating a verifiable digital identity including a memory storing sequences of instructions, and a processor configured to execute the sequences of instructions, which when executed, causes the processor to perform obtaining a first user-generated item generated through a first certified device, the first user-generated item comprising identifiable features of a first user and a second user. The execution of the sequences of instructions also causes the processor to perform obtaining a second user-generated item generated through a second certified device, the second user-generated item comprising the identifiable features of the first user and the second user. The execution of the sequences of instructions also causes the processor to perform cross-confirming, through the first certified device and the second certified device, that the first user-generated item and the second user-generated item are valid to verify the digital association of the first user and the second user.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate aspects of the subject technology, and together with the description serve to explain the principles of the subject technology. In the drawings.

Figure 1:
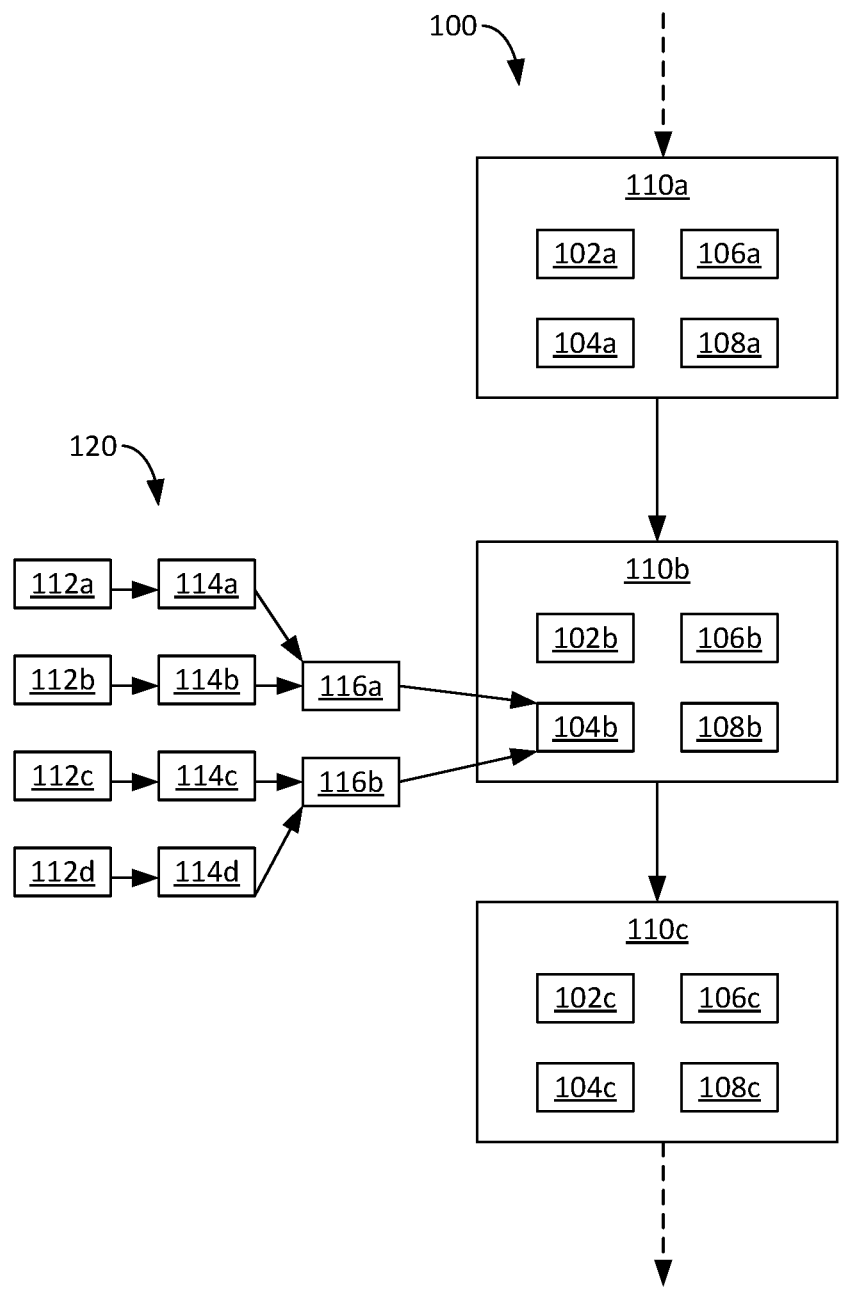
FIG. 1 illustrates an example blockchain system for practicing some implementations of the disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

General Overview

In today's highly connected digital world, digital identities are used by individuals to communicate with others (e.g., phone number, email), access applications (e.g., social media, games, financial institutions), execute transactions (e.g., financial transactions, sign legal documents), and more. An identity, in this context, is some form of digital signature that can be used to authorize an individual to perform activities online. To use an identity, one must authenticate that they are, in fact, the person to whom the digital signature belongs.

Digital identities, while useful for enabling access to online goods and services, are also inherently insecure and unverifiable. They are subject to problems such as having one's identity stolen (i.e., identity theft) in which the thief claims the identity of another person and performs activities on behalf of that person. Access granted by the identity can be used to steal, misrepresent, or perform other fraudulent activities. Furthermore, individuals may also commit identity falsification, where one establishes an identity containing facts about his or herself that are not true (e.g., name, age, nationality) in order to gain access to goods, services, and other things for which their own identity would not otherwise have access (e.g., a separate identity enabling one to vote multiple times in an election).

The system described herein does not require any existing documentation on who people are. Rather, individuals acquire a device, such as a smartphone, and that device includes a private key. The private key is kept in the hardware of the device, such that the private key is inextricably tied to the device. By combining a private key on a device with an operating system on the device, applications executed on the device are able to be run in a secure environment. For example, all inputs to the device, whether through a GPS sensor, a camera, a microphone, etc., can be certified by both the application developer and the operating system on the device. The operating system provides security by only allowing applications that are associated with trusted and certified developers to be executed on the device.

According to another aspect of the present disclosure, the operating system could be in the device hardware itself and therefore immutable. As a result, the hardware device includes fixed software that cannot be modified, which eliminates the threat of any security issues. For example, such a device would include a private key that is tied to the device's hardware, and would be unable to create or otherwise upload digital images without taking an original digital photograph.

According to an aspect of the present disclosure, a secure and verifiable digital identity may be created by a user who owns a device, such as a smartphone. The user takes a picture of themselves, which establishes a visual identity of the user. Then, to further build on that visual identity, the user can take a picture of themselves with someone else at the same time using their device. This establishes the visual identities of two people, and further confirms the visual identity of the user. For example, these two people both have a unique device and a key that cannot be copied. Both devices take the photograph at the same time and place, and both devices certify that the face recognition of the two people in the photograph is the same person as before. Additional verifications can be built into the device, such as biometric verifications (e.g., fingerprint) to verify that the people are the same. As the user takes more photographs of themselves, either alone or with other people, their digital identity associated with their device becomes more established and secure. This is because the relationships a person has in their lives is what makes them unique. A person can only be in one place at one time, and the device with the private key can also only be in one place at one time. As a result, the location of the device and any other devices/users it is associated with becomes a unique and difficult to forge identity.

In order to forge fake identities under the disclosed system, a bad actor would need to purchase multiple devices. The bad actor would then need to make connections with many other devices. The other devices would also need to be integrated into a social web of real people. As a result, it would be very difficult and expensive for bad actors to forge a fake identity.

According to a further aspect of the present disclosure, the photographs including sensor data that was collected at the time the photograph was taken (e.g., a short video containing audio and other information) is uploaded to a blockchain. The blockchain time stamps the photograph and logs all relationships the user has with other people through the photograph. In this way, the blockchain allows everyone in the world to verify the uniqueness of individuals and to audit the relationships to identify clusters and other information that would clearly stand out as fraudulent. For example, when a user identifies suspicious activity, they can access the photographs, look at the people involved, and hold those people accountable for any fraud. Thus, the entire world can verify the user identities without having to rely on a single centralized issuer.

The disclosed system addresses a problem in traditional digital identity verification systems, namely the technical problem of creating a verifiable digital identity that cannot be stolen or falsified. As described above, conventional digital identity verification techniques are susceptible to the same issues of falsification and identity theft that also plague traditional forms of government-issued identification. The disclosed system solves this technical problem by providing a solution also rooted in computer technology, namely, by creating a verifiable digital identity that is stored in a blockchain.

The disclosed subject technology further provides improvements to the functioning of the computer itself because it improves the security of the computer and reduces the cost of resources for validating identities. Specifically, a private key is immutably tied to the hardware of a device. This overcomes shortcomings associated with current solutions, which are monetarily costly and involve greater system resources.

As used herein, the term "blockchain" refers generally to an open and distributed public ledger comprising a growing list of records, which are linked using cryptography. By design, the blockchain is resistant to modification of the data. The blockchain can include an auditable database that provides a distributed, replicated ledger of cryptographically certified artifacts whose contents are extremely difficult to tamper with without detection, and therefore, are with very high probability, true copies of the intended content, and whose content are open for inspection via a suitable query interface.

As used herein, the term "block" generally refers to a record that is kept in a blockchain. For example, each block contains a cryptographic hash of the previous block, a timestamp, and transaction data, which can generally be represented as a merkle tree root hash.

Example System Architecture

FIG. 1 illustrates a blockchain system 100 that can be utilized for creating and verifying a digital identity. As shown, the blockchain system 100 includes several blocks 110. For simplicity, three blocks 110 are shown. Each block 110 includes a previous hash 102, a transaction root 104, a timestamp 106, and a nonce 108.

The previous hash 102 is the value obtained by hashing a previous block 110 in the blockchain system 100. For example, if block 110b is the Nth block in the blockchain system 100, then the previous hash 102b is the value of the hash of block N-1, which in this case would be block 110a. Similarly, the previous hash 102c is the value of the hash of block 110b.

The transaction root 104 is the root hash value of a hash tree 120 (e.g., a merkle tree) over all transactions to be added to the block 110. For example, transactions 112a, 112b, 112c, and 112d are to be added to block 110b. According to an aspect of the present disclosure, transactions 112a-112d may be any type of transaction, and may include any type of data of any length such as photographs, videos, sound recordings, etc. In order to add transactions 112a-112d to the blockchain system 100, each transaction 112a-112d is hashed to obtain hashed transactions 114a, 114b, 114c, and 114d. For example, hashing transaction 112a yields hashed transaction 114a, hashing transaction 112b yields hashed transaction 114b, and so on.

The hashed transactions 114a-114d are then hashed with each other to obtain hashes 116a and 116b. For example, hashed transaction 114a is hashed with hashed transaction 114b to obtain hash 116a, and hashed transaction 114c is hashed with hashed transaction 114d to obtain hash 116b. Finally, hash 116a is hashed with hash 116b to obtain the transaction root 104b. It will be appreciated that although the hash tree 120 for block 110b is shown, it is understood that all transaction roots 104 of all blocks 110 in the blockchain system 100 include a corresponding hash tree 120. As a result, each block 110 added to the blockchain system 100 is a confirmation of all the transactions that occurred before, making the blockchain system 100 effectively permanent and immutable. This is because it would be computationally impractical/impossible to modify the blocks 110 of the blockchain system 100 by any bad actors.

According to an aspect of the present disclosure, hashing can be accomplished using cryptographic hash functions such as, including, but not limited to, Secure Hash Algorithm (SHA) 0, SHA-1, SHA-2, SHA-3, ..., SHA-256, etc., or Digital Signature Hash Algorithm (DSA).

In operation, rewards may be issued to users who add blocks 110 to the blockchain system 100. The rewards may include monetary fees or other incentives that may be spent either within or outside of the blockchain system 100. In order to maintain fairness of reward distribution and to ensure the integrity of the blockchain system 100, users must compete with each other to add each block 110. For example, users competing to add block 110b to the blockchain system 100 must include a proof-of-work to be considered valid. This proof-of-work is tied to the nonce 108 and is verified by other users (e.g., nodes) each time a block 110 is added. According to an aspect of the present disclosure, the nonce 108 is a 32-bit field whose value may be adjusted to either speed up or slow down the addition of new blocks 110. Although a proof-of-work system has been described, it is understood that the implementations also apply to other types of systems regardless of distributed consensus protocol, including but not limited to, distributed proof-of-stake.

According to an aspect of the present disclosure, the blockchain system 100 can include publicly distributed block headers, which is a technology known to meet the requirements of storing replicated artifacts in publicly available distributed storage facilities that cannot be tampered with, and that are readily available for inspection. According to an aspect, the blockchain system 100 is a public blockchain.

Example System for Creating and a Digital Identity

Figure 2A:
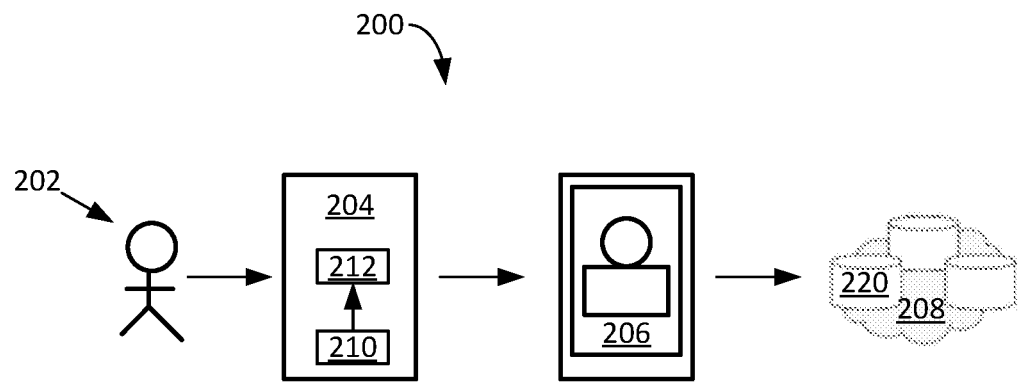
FIG. 2A illustrates an example system for creating a secure digital identity, according to certain aspects of the disclosure.

FIG. 2A illustrates an example system 200 for creating a secure digital identity 220, according to certain aspects of the disclosure. The system 200 includes a user 202 (e.g., a first user), a certified device 204 (e.g., a first certified device), certified data 206, and a blockchain 208. The certified device 204 includes a private key 210 (e.g., a first private key) that is tied to hardware of the certified device 204. For example, the private key 210 may include an International Mobile Equipment Identity (IMEI) number, or other such unique identifier of the certified device 204. The certified device 204 can include a smartphone, tablet computer, laptop computer, personal digital assistant (PDA) or any other such device.

According to an aspect of the present disclosure, the user 202 first certifies himself/herself to the certified device 204 by entering certification information, such as a passcode, password, biometric input, etc. For example, the user 202 may use a fingerprint or other biometric input to unlock the certified device 204.

According to an aspect of the present disclosure, the user 202 uses the certified device 204 to obtain the certified data 206 (e.g., a user-generated item). For example, the user 202 may install a certified application 212 (e.g., a first certified application) that uses the private key 210 to generate the certified data 206. The certified application 212 may be accessed by verifying a biometric of the user 202, such as a fingerprint, voice, iris, face, etc. The certified application 212 may be configured to only execute on the certified device 204, and may utilize the private key 210 to certify that the generated certified data 206 is from the user 202. This is because the certified device 204 can only be in one place at a time, and the user 202 can also only be in one place at a time. Therefore, the generated certified data 206 is certain to be from the user 202. For example, the user 202 utilizes the certified device 204 to take a photograph of himself/herself. The photograph is certified by the certified device 204 to generate the certified data 206. The certified data 206 is then uploaded to the blockchain 208. For example, the blockchain 208 may be substantially similar to the blockchain system 100 described above. Once on the blockchain 208, the photograph of the user 202 is validated through facial recognition software, and becomes a digital identity 220 of the user 202. As the user 202 takes and uploads additional photographs of himself/herself, the digital identity 220 of the user 202 becomes more established and secure.

According to an additional aspect, the certified data 206 may include various types of data. For example, the certified data 206 may include a live photograph of the user 202. The live photograph (e.g., a short video) can include additional information captured simultaneously at the time the photograph was taken. The live photograph can include several frames of the user 202 captured in sequence over a short period of time (e.g., one second), as opposed to a single frame photograph. Such additional information can include location information such as GPS data, environmental sounds, a timestamp, or any other such sensor data. The inclusion of this additional information adds to the security of the certified data 206 by further certifying it is the user 202 taking the photograph, and makes it even more difficult for a bad actor to spoof.

According to another aspect of the present disclosure, an operating system of the certified device 204 can be in the device hardware itself and therefore immutable. As a result, the certified device 204 includes fixed software that cannot be modified, which eliminates the threat of any security issues. For example, the certified device 204 can include the private key 210 that is tied to the device's hardware. Thus, the certified device 204 would be unable to create or otherwise upload digital images without taking an original digital photograph.

According to an aspect of the present disclosure, to further build on the visual digital identity 220, the user 202 can take a picture of themselves with someone else using another certified device 204 at the same time. This establishes the visual identities of two people, and further confirms the visual identity of the user 202. For example, these two people both can have a unique device 204 and a private key 210 that cannot be copied. Both devices 204 take the photograph (e.g., the certified data 206) at the same time and place, and both devices 204 certify that the face recognition of the two people in the photograph is the same person as before. Additional verifications can be built into the device 204, such as biometric verifications (e.g., fingerprint) to verify that the people are the same. As the user 202 takes more photographs of themselves, either alone or with other people, their digital identity 220 associated with their device 204 becomes more established and secure. This is because the relationships a person has in their lives is what makes them unique. A person can only be in one place at one time, and the device 204 with the private key 210 can also only be in one place at one time. As a result, the location of the device 204 and any other devices/users it is associated with becomes a unique and difficult to forge identity 220.

According to an additional aspect of the present disclosure, the user 202 may be designated as a trustworthy source. For example, once the user 202 has uploaded a threshold amount of certified data 206, has been active for a defined period without issues, or otherwise, the user 202 may become designated as a trustworthy source. Once designated as a trustworthy source, whenever the user 202 interacts with another user (e.g., takes a photo of or with another person), the interaction can be given higher credence. Furthermore, it can be incentivized to have two trustworthy sources interact with each other to form stronger verifications for the digital identity 220. In this way, anomalies may be detected quicker as well, because if trustworthy sources suddenly interact with random strangers, which are outside their circle of trust, then it can be inferred that an attempted breach has occurred.

According to a further aspect of the present disclosure, the photographs (e.g., the certified data 206) including sensor data that was collected at the time the photograph was taken (e.g., a short video containing audio and other information) is uploaded to the blockchain 208. The blockchain 208 time stamps the photograph and logs all relationships the user 202 has with other people through the photograph. In this way, the blockchain 208 allows everyone in the world to verify the uniqueness of individuals and to audit the relationships to identify clusters and other information that clearly stand out as fraudulent. For example, when a user 202 identifies suspicious activity, the user 202 can access the photographs, look at the people involved, and hold those people accountable for any fraud. Thus, the entire world can verify the user's digital identity 220 without having to rely on a single centralized issuer. This saves on resources such as time and money.

Another advantage is that this allows a person to use his/her own face as his/her own proof of identity. Conventional forms of identification have avoided using solely a person's visual or biometric features (e.g., fingerprint, iris, voice, face) because these features may easily be spoofed. For example, a person's face is public for everyone to see, and could be spoofed by creating a mask of the person's face. However, in the implementations described herein, it is not just the visual representation of the person that creates the digital identity 220, but it is also the relationships the person has with other people that are not easily faked, in addition to their face, that secures their digital identity 220.

According to another aspect of the present disclosure, the digital identity 220 includes a cryptographically signed digital artifact that is created by the device 204, which can be used authoritatively to represent an individual. For example, the digital identity 220 can contain identifying information, such as a photo, fingerprint, audio recording, other sensor data, GPS location, etc.

According to aspects of the present disclosure, the digital identity 220 can include certified representations of the certified data 206 and/or the certified data 206 itself, which are stored on the blockchain 208.

As described herein, the system 200 creates verifiable digital identities when people capture certified data 206 using their certified devices and log the certified data 206 to the blockchain as the digital identity 220.

Figure 2B:
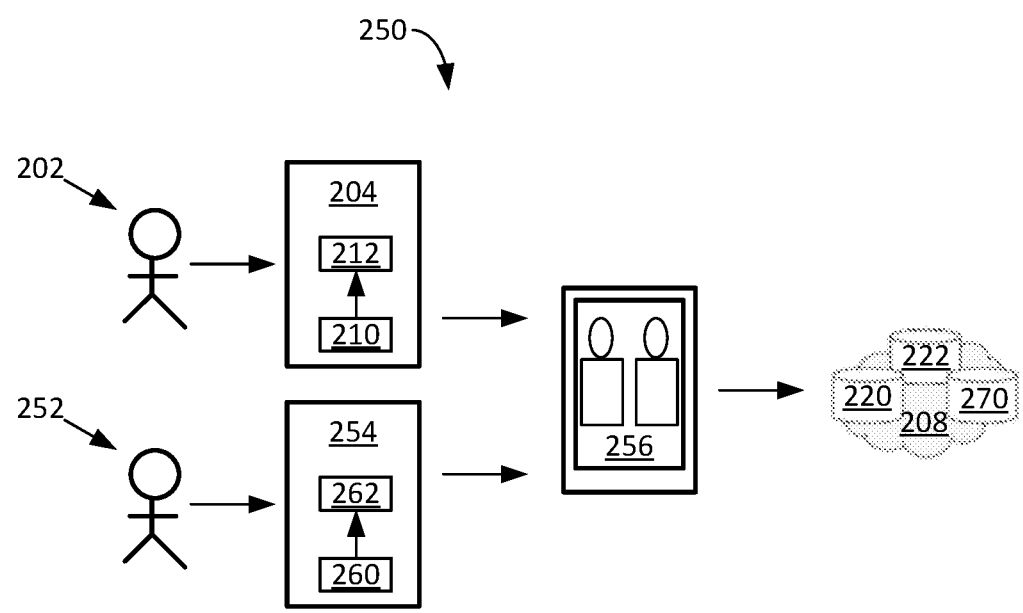
FIG. 2B illustrates an example system for creating a verified digital association, according to certain aspects of the disclosure.

FIG. 2B illustrates an example system 250 for creating a verified digital association 270, according to certain aspects of the disclosure. The digital association system 250 includes all the features described above, in relation to the digital identity system 200, and further includes a user 252 (e.g., a second user), a certified device 254 (e.g., a second certified device), association data 256, and a digital association 270. The certified device 204 includes a private key 260 (e.g., a second private key) that is tied to hardware of the certified device 204.

Similar to FIG. 2A above, each user (e.g., user 202 and user 252) creates their own digital identity and stores it on the blockchain 208. For example, user 202 creates digital identity 220 (e.g., a first digital identity) and user 252 creates digital identity 222 (e.g., a second digital identity) according to the steps outlined above in FIG. 2A.

To create the digital association 270, user 202 and user 252 can create association data 256 together using their respective certified devices (e.g., certified device 204 and certified device 254). For example, the users can each take a photograph that includes both users together. The photograph can be taken at or around the same time, and/or at or around the same location. For example, facial recognition and other biometric analysis of sensor input combined with geolocation data enable local validation of the association data 256. The certified devices validate and certify the association data 256 to generate the digital association 270. For example, each certified device can sign off on the association data 256 after checks are made by each certified device to ensure the association data 256 has not been tampered. The digital association 270 can include a certified representation of the association data 256. The digital association 270 is stored on the blockchain 208. Using this process, individuals can establish and verify the uniqueness of their identities.

An advantage of creating the digital association 270 is that the digital association 270 verifies the digital identities (e.g., digital identity 220 and digital identity 222) of the users. This is because the use of multiple devices provides the ability to perform additional checks to further verify the validity of the association data 256 and the corresponding digital association 270. It is understood that although two certified devices are described, three or more certified devices may similarly act together to create the digital association 270.

According to an aspect of the present disclosure, a certified application 262 (e.g., a second certified application) can be installed on the second device 254. The second certified application 254 can be the same or different from the first certified application 212. The certified applications on each device can coordinate with each other to manage the recording activity on both certified devices. For example, both certified devices can be held in place to take the photograph of both individuals. When each certified device detects suitable content (e.g., both individuals' faces are recognizable in the photograph), both certified devices simultaneously take a photograph.

According to an aspect of the present disclosure, each device creates association data 256. The association data 256 is checked by the device that created it for tampering, and is then sent to the other device for a comparison. For example, first certified device 204 can take a first photograph and verify that the photograph has not been tampered. The first certified device 204 digitally signs the photograph and sends the digitally signed photograph to the second certified device 254 for another round of validations. Similarly, the second certified device 254 can take a second photograph that is substantially similar to the first photograph. The second device 254 verifies the validity of the second photograph, digitally signs the second photograph, and send the digitally signed photograph to the first certified device 204 for further validation. According to an aspect, on receipt, each certified device can perform a comparison of both photographs, including surroundings, by comparing audio signals and other signals (e.g., WiFi and other radio signals) in the area. These are examples of techniques that can be used to determine that the photographs taken on each certified device represent the same digital signature and/or digital signing occasion.

According to a further aspect, each certified device can add its signature to the photograph received from the other, then sends the signed copy back to the other device, where each certified device can compare its originals with the doubly-signed copy. At completion of this process, each certified device will have two photographs of the same event, such that both photographs are signed by both parties. Each certified device can then register the signing transaction with both multi-signed photographs as part of the digital association 270 with the blockchain 208.

According to an aspect of the present disclosure, the digital association 270 can include a cryptographically signed digital artifact created by two or more certified devices in close proximity. The digital association 270 can be used to authoritatively represent a relationship between two unique digital identities (e.g., first digital identity 220 and second digital identity 222) to establish a verified relationship. For example, the verified relationship can be a certified relationship between two individuals that establishes a mutually auditable verification of each other.

According to an aspect of the present disclosure, the association data 256 can contain a photograph of two or more people. The photograph can be a live photo captured as several frames in sequence over a short period of time (e.g., one second), as opposed to a single frame photograph. The association data 256 can also contain GPS location and use communication latency to establish proof of presence (i.e., to certify the people in the photograph were actually in the same location), and can also contain other sensor information recorded by the certified devices that can be used to establish the context of the association data 256, including, but not limited to, background audio, WiFi transmissions, and other radio frequencies and recordable characteristics of the environment.

According to aspects of the present disclosure, the digital association 270 can include certified representations of the association data 256 and the digital identities (e.g., first digital identity 220 and/or the second digital identity 222) and/or the association data 256 and the digital identities themselves, which are stored on the blockchain 208.

As described herein, the system 250 creates verifiable identities when people capture association data 256 using their certified devices and log the association data 256 to the blockchain as the digital association 270.

Figure 3:
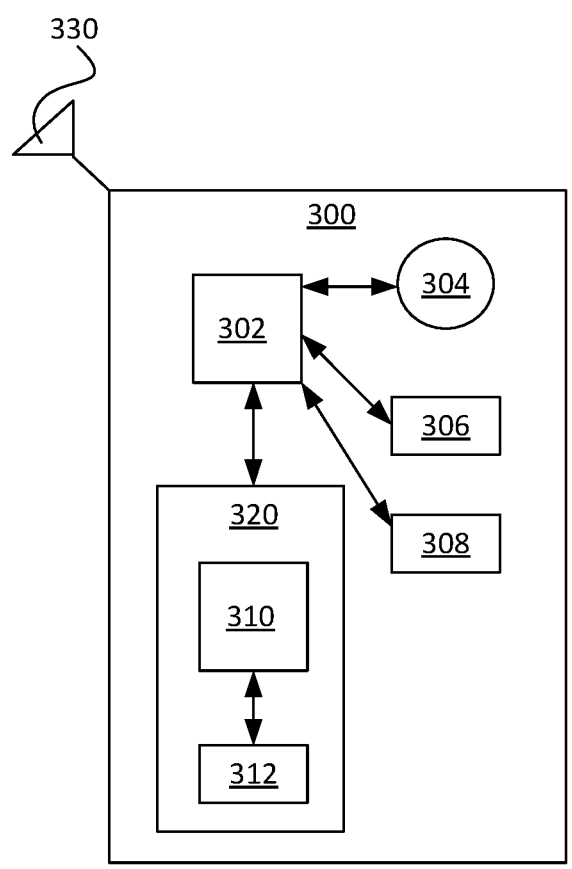
FIG. 3 is a block diagram illustrating an example device through which a verified digital association can be created, according to certain aspects of the disclosure.

FIG. 3 is a block diagram illustrating an example device 300 through which a digital identity can be created, according to certain aspects of the disclosure. The device 300 can be any electronic device, including, but not limited to, a smartphone, laptop, tablet computer, PDA etc. According to an aspect, the device 300 includes a central processing unit (CPU) 302 (e.g., an Advanced RISC Machines (ARM) processor), a camera 304, a microphone 306, a Global Positioning System (GPS) 308, a T3 microprocessor chip 310, a secure identification element 312 (e.g., fingerprint, facial identification, other biometric input, password, passcode, etc.), and a network connectivity module 330 (e.g., antenna configured for wireless communications, Bluetooth, WiFi, etc.). The T3 microprocessor chip 310 and the secure identification element 312 can be included in a secure enclave 320. For example, the secure enclave 320 is where secure elements are separately housed in the device 300 to resist/prevent tampering.

According to an aspect of the present disclosure, the CPU 302 is communicatively coupled with each of the camera 304, the microphone 306, the GPS 308, and the secure enclave 320. Furthermore, the T3 microprocessor chip 310 is communicatively coupled to the secure identification element 312. It is understood that the device 300 can include additional elements that are not illustrated, such as elements that are included in standard mobile electronic devices such as smartphones.

According to further aspects, the device 300 can include a smartphone configured produce certified artifacts, such as the digital identities and verifications described herin. The device 300 can utilize integrated hardware and an operating system with secure capability that restricts access to and use of protected information to only their intended purposes. The device 300, in a cryptographically secure way, can authenticate and certify data and calculations using sensor inputs on the device 300 (e.g., collect a fingerprint, perform facial recognition, retinal scan, record an audio signature, etc.). The device 300 can further be configured to take a photo, record location, and can also record other types of data, such as, including but not limited to, an audio signature, radio transmissions, WiFi activity. The device 300 can further be configured to digitally certify any resulting content as only belonging to the authenticated individual. The device 300 can be utilized by that individual to generate a digital signature to authorize activity, such as certifying the individual's approval of transactions of various kinds.

According to an aspect of the present disclosure, the device 300 includes a smartphone (e.g., an iPhone) with various sensor inputs and a secure enclave processor that is configured to run a secure operating system (e.g., iOS, Android, etc.) and run an application that utilizes the smartphone's capabilities in accordance with the systems and methods described herein.

Figure 4:
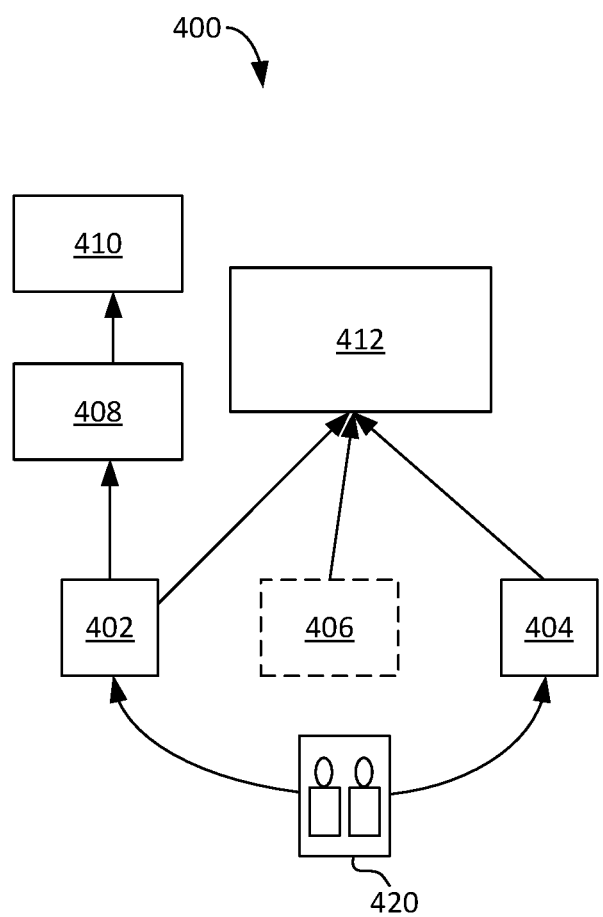
FIG. 4 illustrates an example architecture for creating a verified digital association, according to certain aspects of the disclosure.

FIG. 4 illustrates an example architecture 400 for creating a verified digital association, according to certain aspects of the disclosure. The architecture 400 includes a first device 402, a second device 404, an optional certifier 406 (e.g., a third-party certifier), content addressable storage (CAS) 408, a memory bank 410 (e.g., cloud storage), and a blockchain 412 (e.g., the blockchain system 100 of FIG. 1).

According to an aspect of the present disclosure, the first device 402 and the second device 404 take a photo 420 together. The photo 420 can be five megabytes in size, or any other size. For example, the first device, which belongs to a first person, takes the photo 420 of the first person with a second person. The second device 404, which belongs to the second person, takes the same or similar photo 420 of the first person with the second person at or around the same time. The first device 402 and the second device 404 communicate the photo 420 to each other. The first device 402 and the second device 404 both verify that the photo 420 contains the face of the person that they are expecting (i.e., faces of the first person and the second person). The first device 402 and the second device 404 both digitally sign the photo 420, confirming that the photo 420 is authentic. The first device 402 and the second device 404 each upload the photo 420 to the CAS 408. For example, the CAS 408 can be storage where the photo 420 can be hashed and stored under a file name. A copy of the photo 420 and its hash is also uploaded from the CAS 408 to the memory bank 410. This way, when the photo 420 is later downloaded, it can be verified against its copy.

According to an aspect of the present disclosure, the first device 402 and the second device 404 also upload the digitally signed photo 420 to the blockchain 412. For example, a link of the photo 420 can be uploaded to the blockchain 412. It can be later verified that the first device 402 and the second device 404 took the photo 420 by comparing data of the photo 420 and its hash that is stored in the blockchain 412 with the copy of the photo 420 and its hash stored through the CAS and the memory bank 410.

According to an additional aspect of the present disclosure, the optional certifier 406 co-signs the upload photo 420 in order for it to be valid. The optional certifier 406 may be a trusted third-party, and thus further protects against tampering of the photo 420. The optional certifier 406 can certify the photo 420 by confirming that the faces in the photo 420 are the faces of the first person and the second person. For example, the optional certifier 406 has access to a database where it can verify the faces of the first person and the second person.

According to certain aspects, an individual establishes his/her device-specific identity and authentication with his/her respective device (e.g., creates a password, provides a fingerprint). For example, an individual has an application (e.g., the certified application 212 from FIG. 2A) installed on their device (e.g., a certified device). According to an aspect, the individual manually downloads and installs the application, or it can be pre-installed on the device.

According to certain aspects, after an individual has established his/her identity by taking a photo of his/herself and registering the identity creation transaction and related certified photo data (e.g., the certified data 206 of FIG. 2A) with the auditable storage (e.g., the blockchain system 100 of FIG. 1), to establish a personal identity, the collaborative, social identity creation and verification process can begin. For example, two individuals with suitable devices use the application on one of the devices to take a joint photo (e.g., photo 420) of the two individuals together. The joint photo captures several frames in sequence over a short period of time (e.g., one second), and also captures sound and possibly other signals in the proximity (e.g., WiFi network availability, radio waves, etc.), and the geolocation of the individuals.

According to an aspect, the use of the application may or may not be evident to the user. For example, an individual can explicitly start the application (e.g., touch the application icon) and then select the option to create a new joint photo. As another example, the device can have the application pre-installed and associated with the device's camera application, in which case when the user takes a picture, the application is activated and can determine whether the individual is attempting to take a joint picture with another individual. For example, similar capability exists in cameras that can detect QR codes.

After the two individuals take their joint photo together, the application on each device taking the photo uses recognition techniques, such as 3D-facial recognition, to verify that two individuals are in the photo, and that the authenticated individual of the device is one of those two. When the application has confirmed those conditions, the application signs the joint photo with the device's digital signature capability, then sends a copy of the photo to the other individual's device.

In another example, an individual can share his or her identifying features that allow the application on the other individual's device to identify both faces simultaneously. When a device receives the signed photo from the other individual's device, it uses recognition techniques, such as facial recognition, to verify that two individuals are in the photo, and that the authenticated user of the device is one of those two. When the application has confirmed those conditions, the application signs the joint photo with the device's digital signature capability. The device recognizes that the photo has already been signed by another individual. The device presents a human readable form of the identity of the other individual (e.g., the individual's name) and asks for confirmation that this is, indeed, a valid photo of the two individuals together. Additional checks can be made to determine that the individuals are in close proximity, such as using geo-location information, time of day, latency of communication between the two devices, etc.

The device sends a copy of the photo signed by both individuals to the original device (i.e., the one taking the photo). The application on the device confirms that the photo is signed by both individuals, performs a comparison of the photo with the original to ensure the photo has not been tampered with, and updates its photo with the copy signed by both individuals. Each device sends a digitally signed statement to the auditable database registering the transaction. This statement can include the multi-signed photo or some other suitable representation of the photo, such as a digital hash of the photo.

Each device uploads its digitally signed copy of the photograph to a content storage server (e.g., CAS 408). The content storage server can handle the photo in several ways. For example, the content storage server can detect duplicate copies of the photo and store only one copy, annotating that it received a copy from each device. The content storage server can also choose to store the copy of the photo from each device, noting which device the photo came from. According to an aspect, the content storage server can retain previous copies of a joint photo from the same individuals, or it can choose to replace previous copies with the most recent. The content storage server can also store some number of copies, such as the most recent three, or any other user-defined limit.

On completion of this process, the identities that each individual in the joint photo has established on his or her device is now verifiably registered in the auditable database. The individuals become mutually auditable verifiers of the other individual. An individual repeating the process with the same individual over time, and performing the process with many other individuals further strengthens that individual's identity, and provides avenues for auditing identities and detecting fraudulent use or abuse of the individual's identity.

The techniques described herein may be implemented as method(s) that are performed by physical computing device (s), as one or more non-transitory computer-readable storage media storing instructions (e.g., stored sequences of instructions) which, when executed by computing device(s), cause performance of the method(s), or, as physical computing device(s) that are specially configured with a combination of hardware and software that causes performance of the method(s).

Figure 5:
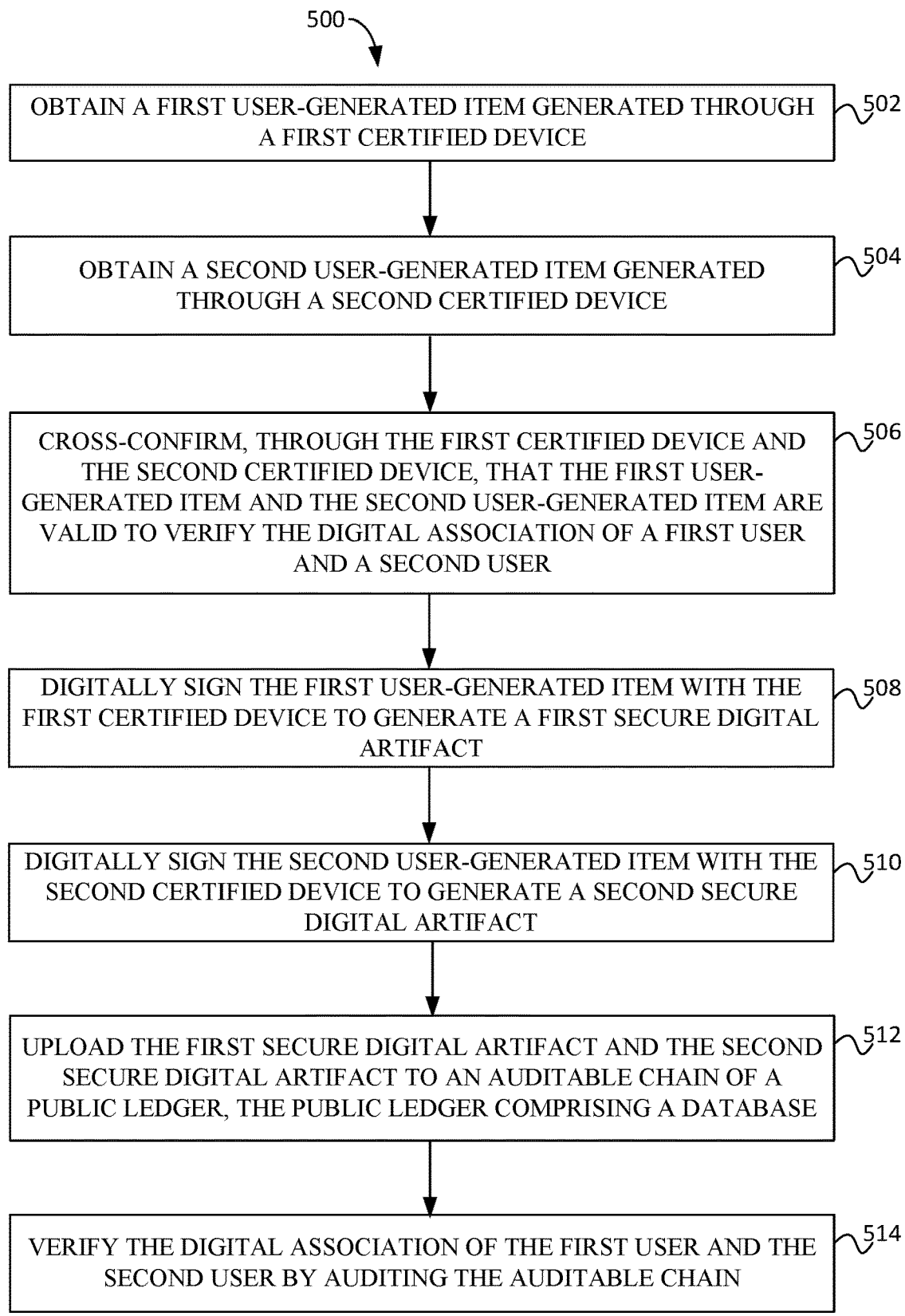
FIG. 5 illustrates an example flow diagram for creating a verified digital association, according to certain aspects of the disclosure.

FIG. 5 illustrates an example process flow diagram 500 for a computer-implemented method for creating a digital association, according to certain aspects of the disclosure. For explanatory purposes, the example process 500 is described herein with reference to the blockchain system 100 of FIG. 1 and the digital association system 250 of FIG. 2B. Further for explanatory purposes, the blocks of the example process 500 are described herein as occurring in serial, or linearly. However, multiple blocks of the example process 500 may occur in parallel. In addition, the blocks of the example process 500 need not be performed in the order shown and/or one or more of the blocks of the example process 500 need not be performed. For purposes of explanation of the subject technology, the process 500 will be discussed in reference to FIGS. 1 and 2B.

At block 502, a first user-generated item generated through a first certified device is obtained. The first user-generated item includes a first user identifiable feature of a first user (e.g., a first identifiable feature) and a second user identifiable feature of a second user (e.g., a second identifiable feature). The identifiable features may be the same or different. For example, the first user identifiable feature and second user identifiable feature may be the faces of the first user and the second user, or the first user identifiable feature may be the mouth of the first user and the second user identifiable feature may be the eyes of the second user. It is understood that other identifiable features may be included.

At block 504, a second user-generated item generated through a second certified device is obtained. The second user-generated item includes the first user identifiable feature of the first user and the second user identifiable feature of the second user.

At block 506, the first certified device and the second certified device cross-confirm that the first user-generated item and the second user-generated item are valid to verify the digital association of the first user and the second user.

At block 508, the first user-generated item is digitally signed with the first certified device to generate a first secure digital artifact, At block 510, the second user-generated item is digitally signed with the second certified device to generate a second secure digital artifact, and At block 512, the first secure digital artifact and the second secure digital artifact are uploaded to an auditable chain of a public ledger, the public ledger comprising a database.

At bock 514, the digital association of the first user and the second user is verified by auditing the auditable chain.

According to an aspect of the present disclosure, the process 500 further includes verifying the first certified device belongs to the first user, and verifying the second certified device belongs to the second user.

According to an aspect of the present disclosure, verifying the first certified device includes establishing a first form of authentication for the first certified device, the first form of authentication comprising at least one of a password, an audio signature, or a biometric input, the biometric input comprising a fingerprint or facial recognition.

According to an aspect of the present disclosure, verifying the second certified device includes establishing a second form of authentication for the second certified device, the second form of authentication comprising at least one of a password, an audio signature, or a biometric input, the biometric input comprising a fingerprint or facial recognition.

According to an aspect of the present disclosure, the process 500 further includes tying the first certified device to a first private key, the first private key located on the first certified device, and tying the second certified device to a second private key, the second private key located on the second certified device.

According to an aspect of the present disclosure, the process 500 further includes digitally signing the second user-generated item with the first certified device to generate the second secure digital artifact, and digitally signing the first user-generated item with the second certified device to generate the first secure digital artifact.

According to an aspect of the present disclosure, the process 500 further includes digitally signing the first user-generated item with a third-party certifier to generate the first secure digital artifact, and digitally signing the second user-generated item with the third-party certifier to generate the second secure digital artifact.

According to an aspect of the present disclosure, the process 500 further includes obtaining first sensor data associated with the first user-generated item, and obtaining second sensor data associated with the second user-generated item.

According to an aspect of the present disclosure, the cross-confirming includes comparing the first user identifiable feature from the first user-generated item with the first user identifiable feature from the second user-generated item, and verifying the digital association when the comparing is within a threshold.

Hardware Overview

Figure 6:
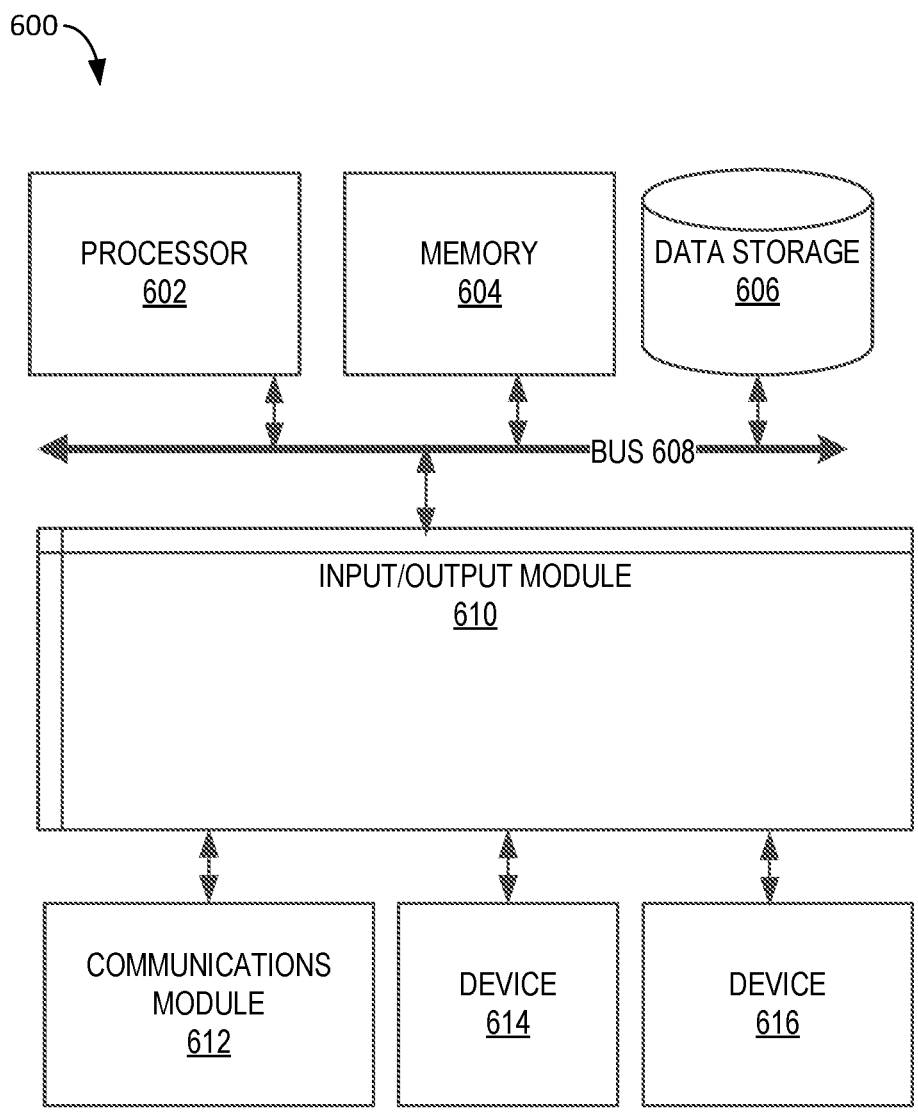
FIG. 6 is a block diagram illustrating an example computer system with which aspects of the subject technology can be implemented.

FIG. 6 is a block diagram illustrating an example computer system 600 with which the blockchain system 100 of FIG. 1 and the digital association system 250 of FIG. 2B can be implemented. In certain aspects, the computer system 600 may be implemented using hardware or a combination of software and hardware, either in a dedicated server, or integrated into another entity, or distributed across multiple entities.

Computer system 600 (e.g., blockchain system 100 and digital identity system 200) includes a bus 608 or other communication mechanism for communicating information, and a processor 602 coupled with bus 608 for processing information. According to one aspect, the computer system 600 can be a cloud computing server of an IaaS that is able to support PaaS and SaaS services. According to one aspect, the computer system 600 is implemented as one or more special-purpose computing devices. The special-purpose computing device may be hard-wired to perform the disclosed techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices, or any other device that incorporates hard-wired and/or program logic to implement the techniques. By way of example, the computer system 600 may be implemented with one or more processors 602. Processor 602 may be a general-purpose microprocessor, a microcontroller, a Digital Signal Processor (DSP), an ASIC, an FPGA, a Programmable Logic Device (PLD), a controller, a state machine, gated logic, discrete hardware components, or any other suitable entity that can perform calculations or other manipulations of information.

Computer system 600 can include, in addition to hardware, code that creates an execution environment for the computer program in question, e.g., code that constitutes processor firmware, a protocol stack, a database management system, an operating system, or a combination of one or more of them stored in an included memory 604, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 608 for storing information and instructions to be executed by processor 602. The processor 602 and the memory 604 can be supplemented by, or incorporated in, special purpose logic circuitry. Expansion memory may also be provided and connected to computer system 600 through input/output module 610, which may include, for example, a SIMM (Single In Line Memory Module) card interface. Such expansion memory may provide extra storage space for computer system 600, or may also store applications or other information for computer system 600. Specifically, expansion memory may include instructions to carry out or supplement the processes described above, and may include secure information also. Thus, for example, expansion memory may be provided as a security module for computer system 600, and may be programmed with instructions that permit secure use of computer system 600. In addition, secure applications may be provided via the SIMM cards, along with additional information, such as placing identifying information on the SIMM card in a non-hackable manner.

The instructions may be stored in the memory 604 and implemented in one or more computer program products, e.g., one or more modules of computer program instructions encoded on a computer readable medium for execution by, or to control the operation of, the computer system 600, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, with languages, embeddable languages, and xml-based languages. Memory 604 may also be used for storing temporary variable or other intermediate information during execution of instructions to be executed by processor 602.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network, such as in a cloud-computing environment. The processes and logic flows described in this specification can be performed by one or more programmable processors executing one or more computer programs to perform functions by operating on input data and generating output.

Computer system 600 further includes a data storage device 606 such as a magnetic disk or optical disk, coupled to bus 608 for storing information and instructions. Computer system 600 may be coupled via input/output module 610 to various devices. The input/output module 610 can be any input/output module. Example input/output modules 610 include data ports such as USB ports. In addition, input/output module 610 may be provided in communication with processor 602, so as to enable near area communication of computer system 600 with other devices. The input/output module 610 may provide, for example, wired communication in some implementations, or wireless communication in other implementations, and multiple interfaces may also be used. The input/output module 610 is configured to connect to a communications module 612. Example communications modules 612 include networking interface cards, such as Ethernet cards and modems.

The components of the system can be interconnected by any form or medium of digital data communication (e.g., a communication network). The communication network can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a ring network, a mesh network, a star-bus network, tree or hierarchical network, or the like. The communications modules can be, for example, modems or Ethernet cards.

For example, in certain aspects, communications module 612 can provide a two-way data communication coupling to a network link that is connected to a local network. Wireless links and wireless communication may also be implemented. Wireless communication may be provided under various modes or protocols, such as GSM (Global System for Mobile Communications), Short Message Service (SMS), Enhanced Messaging Service (EMS), or Multimedia Messaging Service (MMS) messaging, CDMA (Code Division Multiple Access), Time Division Multiple Access (TDMA), Personal Digital Cellular (PDC), Wideband CDMA, General Packet Radio Service (GPRS), or LTE (Long-Term Evolution), among others. Such communication may occur, for example, through a radio-frequency transceiver. In addition, short-range communication may occur, such as using a BLUETOOTH, WI-FI, or other such transceiver.

In any such implementation, communications module 612 sends and receives electrical, electromagnetic, or optical signals that carry digital data streams representing various types of information. The network link typically provides data communication through one or more networks to other data devices. For example, the network link of the communications module 612 may provide a connection through local network to a host computer or to data equipment operated by an Internet Service Provider (ISP). The ISP in turn provides data communication services through the world wide packet data communication network now commonly referred to as the "Internet." The local network and Internet both use electrical, electromagnetic, or optical signals that carry digital data streams. The signals through the various networks and the signals on the network link and through communications module 612, which carry the digital data to and from computer system 600, are example forms of transmission media.

Computer system 600 can send messages and receive data, including program code, through the network(s), the network link, and communications module 612. In the Internet example, a server might transmit a requested code for an application program through the Internet, the ISP, the local network, and communications module 612. The received code may be executed by processor 602 as it is received, and/or stored in data storage 606 for later execution.

In certain aspects, the input/output module 610 is configured to connect to a plurality of devices, such as an input device 614 and/or an output device 616. Example input devices 614 include a keyboard and a pointing device, e.g., a mouse or a trackball, by which a user can provide input to the computer system 600. Other kinds of input devices 614 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Example output devices 616 include display devices, such as an LED (light emitting diode), CRT (cathode ray tube), LCD (liquid crystal display) screen, a TFT LCD (Thin-Film-Transistor Liquid Crystal Display), or an OLED (Organic Light Emitting Diode) display, for displaying information to the user. The output device 616 may comprise appropriate circuitry for driving the output device 616 to present graphical and other information to a user.

According to one aspect of the present disclosure, the blockchain system 100 and/or the digital identity system 200 can be implemented using a computer system 600 in response to processor 602 executing one or more sequences of one or more instructions contained in memory 604. Such instructions may be read into memory 604 from another machine-readable medium, such as data storage device 606. Execution of the sequences of instructions contained in main memory 604 causes processor 602 to perform the process steps described herein. One or more processors in a multi-processing arrangement may also be employed to execute the sequences of instructions contained in memory 604. Processor 602 may process the executable instructions and/or data structures by remotely accessing the computer program product, for example by downloading the executable instructions and/or data structures from a remote server through communications module 612 (e.g., as in a cloud-computing environment). In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. For example, some aspects of the subject matter described in this specification may be performed on a cloud-computing environment. Accordingly, in certain aspects, a user of systems and methods as disclosed herein may perform at least some of the steps by accessing a cloud server through a network connection. Further, data files, circuit diagrams, performance specifications, and the like resulting from the disclosure may be stored in a database server in the cloud-computing environment, or may be downloaded to a private storage device from the cloud-computing environment.

Computing system 600 can include clients and servers. A client and server are generally remote from each other and typically interact through a communication network. The relationship of client and server arises by virtue of computer programs running on the respective computers and having a client-server relationship to each other. Computer system 600 can be, for example, and without limitation, a desktop computer, laptop computer, or tablet computer. Computer system 600 can also be embedded in another device, for example, and without limitation, a mobile telephone, a personal digital assistant (PDA), a mobile audio player, a Global Positioning System (GPS) receiver, and/or a television set top box.

The term "machine-readable storage medium" or "computer-readable medium" as used herein refers to any medium or media that is provided including instructions or data to processor 602 for execution. The term "storage medium" as used herein refers to any non-transitory computer readable storage medium that stores data and/or instructions that cause a machine to operate in a specific fashion. Such a medium may take many forms, including, but not limited to, non-volatile media, volatile media, and transmission media. Non-volatile media include, for example, optical disks, magnetic disks, or flash memory, such as data storage device 606. Volatile media include dynamic memory, such as memory 604. Transmission media include coaxial cables, copper wire, and fiber optics, including the wires that comprise bus 608. Common forms of machine-readable media include, for example, a floppy disk, a flexible disk, a hard disk, magnetic tape, any other magnetic medium, a CD-ROM, a DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire, and fiber optics, including the wires that comprise bus 608. Transmission media can also take the form of acoustic or light waves, such as those generated during radio-wave and infra-red data communications. Furthermore, as used in this specification of this application, the terms "computer," "server," "processor," and "memory" all refer to electronic or other technological devices. These terms exclude people or groups of people. For the purposes of the specification, the terms display or displaying means displaying on an electronic device.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. Relational terms such as first, second, and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public, regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately, or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method for creating a digital association, comprising:
   obtaining a first user-generated item generated through a first certified device, the first user-generated item comprising identifiable features of a first user and a second user, the second user different from the first user, and the first certified device digitally signing the first-user generated item to generate a first secure digital identity;
   obtaining a second user-generated item generated through a second certified device different from the first certified device, the second user-generated item comprising the identifiable features of the first user and the second user, the second certified device digitally signing the second user-generated item to generate a second secure digital identity;
   cross-confirming, through the first certified device and the second certified device, that the first user-generated item and the second user-generated item are valid to verify the digital association of the first user and the second user; and
   uploading the first secure digital identity and the second secure digital identity to a public ledger comprising a database,
   wherein a link is created to associate the first user-generated item with the second user-generated item.

2. The computer-implemented method of claim 1, further comprising:
   verifying the first certified device belongs to the first user; and
   verifying the second certified device belongs to the second user.

3. The computer-implemented method of claim 2, wherein:
   verifying the first certified device comprises:
      establishing a first form of authentication for the first certified device, the first form of authentication comprising at least one of a password, an audio signature, or a biometric input, the biometric input comprising a fingerprint or facial recognition, and
   verifying the second certified device comprises:
      establishing a second form of authentication for the second certified device, the second form of authentication comprising at least one of a password, an audio signature, or a biometric input, the biometric input comprising a fingerprint or facial recognition.

4. The computer-implemented method of claim 2, further comprising:
   tying the first certified device to a first private key, the first private key located on the first certified device; and
   tying the second certified device to a second private key, the second private key located on the second certified device.

5. The computer-implemented method of claim 1, further comprising:
   digitally signing the second user-generated item with the first certified device to generate a second secure digital artifact; and
   digitally signing the first user-generated item with the second certified device to generate a first secure digital artifact.

6. The computer-implemented method of claim 1, further comprising:
   digitally signing the first user-generated item with a third-party certifier to generate a first secure digital artifact; and
   digitally signing the second user-generated item with the third-party certifier to generate a second secure digital artifact.

7. The computer-implemented method of claim 1, further comprising:
   obtaining first sensor data associated with the first user-generated item; and
   obtaining second sensor data associated with the second user-generated item.

8. The computer-implemented method of claim 1, wherein the cross-confirming comprises:
   comparing the identifiable features of the first user and the second user from the first user-generated item with the identifiable features of the first user and the second user from the second user-generated item; and
   verifying the digital association when the comparing is within a threshold.

9. A system for creating a digital association, comprising:
   a memory storing sequences of instructions; and
   a computer processor configured to execute the sequences of instructions which, when executed, causes the computer processor to perform:
      obtaining a first user-generated item generated through a first certified device, the first user-generated item comprising identifiable features of a first user and a second user, the second user different from the first user, and the first certified device digitally signing the first user-generated item to generate a first secure digital identity;
      obtaining a second user-generated item generated through a second certified device different from the first certified device, the second user-generated item comprising the identifiable features of the first user and the second user, the second certified device digitally signing the second user-generated item to generate a second secure digital identity;

cross-confirming, through the first certified device and the second certified device, that the first user-generated item and the second user-generated item are valid to verify the digital association of the first user and the second user; and uploading the first secure digital identity and the second secure digital identity to a public ledger comprising a database, wherein a link is created to associate the first user-generated item with the second user-generated item.

10. The system of claim 9, further comprising stored sequences of instructions, which when executed by the processor, cause the processor to perform:

verifying the first certified device belongs to the first user; and verifying the second certified device belongs to the second user.

11. The system of claim 10, wherein:

verifying the first certified device comprises:
establishing a first form of authentication for the first certified device, the first form of authentication comprising at least one of a password, an audio signature, or a biometric input, the biometric input comprising a fingerprint or facial recognition, and verifying the second certified device comprises:
establishing a second form of authentication for the second certified device, the second form of authentication comprising at least one of a password, an audio signature, or a biometric input, the biometric input comprising a fingerprint or facial recognition.

12. The system of claim 10, further comprising stored sequences of instructions, which when executed by the processor, cause the processor to perform:

tying the first certified device to a first private key, the first private key located on the first certified device; and tying the second certified device to a second private key, the second private key located on the second certified device.

13. The system of claim 9, further comprising:

digitally signing the second user-generated item with the first certified device to generate a second secure digital artifact; and digitally signing the first user-generated item with the second certified device to generate a first secure digital artifact.

14. The system of claim 9, further comprising stored sequences of instructions, which when executed by the processor, cause the processor to perform:

digitally signing the first user-generated item with a third-party certifier to generate a first secure digital artifact; and digitally signing the second user-generated item with the third-party certifier to generate a second secure digital artifact.

15. A non-transitory computer readable storage medium is provided including instructions that, when executed by a computer processor, cause the computer processor to perform a method for creating a digital association, the method comprising:

obtaining a first user-generated item generated through a first certified device, the first user-generated item comprising identifiable features of a first user and a second user, the second user different from the first user, and the first certified device digitally signing the first user-generated item to generate a first secure digital identity;

obtaining a second user-generated item generated through a second certified device different from the first certified device, the second user-generated item comprising the identifiable features of the first user and the second user, the second certified device digitally signing the second user-generated item to generate a second secure digital identity;

cross-confirming, through the first certified device and the second certified device, that the first user-generated item and the second user-generated item are valid to verify the digital association of a first user and a second user; and uploading the first secure digital identity and the second secure digital identity to a public ledger comprising a database, wherein a link is created to associate the first user-generated item with the second user-generated item.

16. The non-transitory computer readable storage medium of claim 15, wherein the method further comprises:

verifying the first certified device belongs to the first user; and verifying the second certified device belongs to the second user.

17. The non-transitory computer readable storage medium of claim 15, wherein the method further comprises:

digitally signing the first user-generated item with the first certified device to generate a first secure digital artifact.

18. The non-transitory computer readable storage medium of claim 17, wherein the method further comprises:

digitally signing the second user-generated item with the second certified device to generate a second secure digital artifact.

19. The non-transitory computer readable storage medium of claim 18, wherein the method further comprises:

uploading the first secure digital artifact and the second secure digital artifact to an auditable chain of a public ledger, the public ledger comprising a database.

20. The non-transitory computer readable storage medium of claim 19, wherein the method further comprises:

verifying the digital association of the first user and the second user by auditing the auditable chain.

\* \* \* \* \*